United States Patent
Grötzinger et al.

(10) Patent No.: US 12,325,783 B2
(45) Date of Patent: Jun. 10, 2025

(54) ELECTRICALLY CONDUCTIVE EPOXY RESIN COATING AND ELECTROSTATICALLY DISSIPATIVE FLOOR

(71) Applicant: SIKA TECHNOLOGY AG, Baar (CH)

(72) Inventors: Jochen Grötzinger, Schwäbisch Gmünd (DE); Uwe Von Der Brüggen, Meckesheim (DE); Oguz Sarioglu, Heilbronn (DE); Edis Kasemi, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 18/012,707

(22) PCT Filed: Aug. 31, 2021

(86) PCT No.: PCT/EP2021/074014
§ 371 (c)(1),
(2) Date: Dec. 23, 2022

(87) PCT Pub. No.: WO2022/049070
PCT Pub. Date: Mar. 10, 2022

(65) Prior Publication Data
US 2023/0265260 A1    Aug. 24, 2023

(30) Foreign Application Priority Data

Sep. 1, 2020 (EP) .................... 20193948

(51) Int. Cl.
| | | |
|---|---|---|
| C08K 3/04 | (2006.01) | |
| C08K 5/17 | (2006.01) | |
| C09D 5/24 | (2006.01) | |
| C09D 7/61 | (2018.01) | |
| C09D 163/00 | (2006.01) | |
| E04F 15/18 | (2006.01) | |

(52) U.S. Cl.
CPC ............. C08K 3/041 (2017.05); C08K 5/17 (2013.01); C09D 5/24 (2013.01); C09D 7/61 (2018.01); C09D 163/00 (2013.01); E04F 15/18 (2013.01)

(58) Field of Classification Search
CPC .................................. C08K 3/041
See application file for complete search history.

(56) References Cited

U.S. PATENT DOCUMENTS

| | | | |
|---|---|---|---|
| 9,441,086 B2 * | 9/2016 | Albaugh | C09J 9/02 |
| 2011/0315916 A1 * | 12/2011 | Wilson | C08G 59/504 |
| | | | 977/932 |
| 2019/0048127 A1 | 2/2019 | Kasemi et al. | |
| 2019/0177472 A1 * | 6/2019 | Kasemi | C08G 59/56 |
| 2020/0251628 A1 * | 8/2020 | Tu | H01L 33/52 |
| 2021/0301075 A1 | 9/2021 | Kasemi et al. | |

FOREIGN PATENT DOCUMENTS

| | | |
|---|---|---|
| CN | 107652845 A | 2/2018 |
| CN | 110835491 A | 2/2020 |
| DE | 10 2018 009 794 A1 | 6/2020 |
| EP | 1 437 182 A2 | 7/2004 |
| JP | 2007-277401 A | 10/2007 |
| JP | 2018-532003 A | 11/2018 |
| KR | 10-2019-0140623 A | 12/2019 |
| WO | 2016/023839 A1 | 2/2016 |
| WO | 2017/037069 A1 | 3/2017 |
| WO | 2020/070082 A1 | 4/2020 |
| WO | 2020/070083 A1 | 4/2020 |
| WO | 2020/070112 A1 | 4/2020 |

OTHER PUBLICATIONS

Nov. 17, 2021 International Search Report issued in International Patent Application No. PCT/EP2021/074014.
Mar. 7, 2023 International Preliminary Report on Patentability issued in International Patent Application No. PCT/EP2021/074014.
"General Introduction to Epoxy Resins, Basic Edition 1"; The Japan Society of Epoxy Resin Technology; pp. 122-141 & 316; < http://homepage2.nifty.com/epoxygk;> 2003.

* cited by examiner

*Primary Examiner* — William D Young
(74) *Attorney, Agent, or Firm* — Oliff PLC

(57) ABSTRACT

A combination of carbon nanotubes and at least one amine of formula (I) for producing an electrically conductive epoxy resin coating, and to an electrostatically dissipative floor system, which contains the electrically conductive epoxy resin coating. The epoxy resin floor systems are readily-workable, robust, electrostatically, dissipative, and have a largely constant electrical resistance, which have a highly aesthetic, well-ventilated, even surface.

16 Claims, No Drawings

ELECTRICALLY CONDUCTIVE EPOXY RESIN COATING AND ELECTROSTATICALLY DISSIPATIVE FLOOR

TECHNICAL FIELD

The invention relates to electrically conductive epoxy resin coatings and to the use thereof in electrostatically dissipative floors.

PRIOR ART

Electrostatically dissipative floors, also called ESD floors, are known. They serve to dissipate electrostatic charges that arise in a room, for example as a result of foot traffic or wheeled traffic, via footwear and the floor to a grounding. This avoids spontaneous electrostatic discharges which can lead to defects or faults in the production or handling of sensitive products or instruments.

An electrostatically dissipative floor must have sufficiently low electrical resistance to ground that charges are reliably dissipated, but must only be dissipative to such a degree that there is no risk to the health of persons in the event of contact with electrical current. There are standards for such floors that describe test methods for electrostatic and electrical characteristics. DIN EN 61340-4-1 describes, for example, a test method for determination of the electrical resistance of floor coverings and laid floors, and DIN EN 61340-4-5 assesses electrostatic safety with regard to electrical resistance and the degree to which people, footwear and floor coverings can become charged in combination.

Epoxy resin-based floors are particularly robust in relation to mechanical stress and stability toward many substances. They are therefore particularly suitable for highly demanding industrial production rooms. An epoxy resin-based electrostatically dissipative floor system must achieve a series of properties. It is to form reliable adhesion on different substrates and be installable with minimum complexity. The electrostatic charges absorbent by the floor are to be reliably dissipated downward. For this purpose, what is called a conduction system comprising copper ribbons or wires connected to a grounding is laid beneath the coating. The epoxy resin coating is to be readily installable and compatible with the underlying conduction system and, after curing, is to have an esthetically pleasing uniform surface with high hardness coupled with low brittleness. For this purpose, the epoxy resin coating is to have low viscosity with good leveling and good deaeration and a long open time at ambient temperature, but is nevertheless to cure very rapidly and is not to form any hardening faults such as residual tack, specks or cloudiness. For high slip resistance, a sand may be scattered onto the surface, covered with a seal. After the curing, the coated floor is to have an electrical resistance in the range from about $10^5$ to $10^8$ ohms and is to be robust and durable.

Floors made from synthetic resins such as epoxy resins are insulators. There are various ways of achieving electrical conductivity. A known way is to use ionic liquids or organic salts soluble in the synthetic resin matrix, which provide electrical conductivity. But this slows down curing and severely reduces the mechanical and chemical durability of the floor, and electrical resistance is highly dependent on the current humidity. In addition, conductive solid particles may be added. Suitable examples for this purpose are metals, but these have a strong intrinsic color and, on account of their high specific weight, during the storage of the still-liquid composition, settle to such a degree at the base of the container that homogeneous stirring-up and distribution in the coating is difficult. This leads to nonuniform electrical resistance and zones that have too low a conductivity. Also known is the addition of conductive carbon black or graphite, which does achieve a reliable conductivity, but only very dark to black coatings are obtained owing to the strong black color of these substances, which is usually undesirable for an industrial floor. Also known are fine fibers made of carbon, called carbon fibers. But these likewise present difficulties in homogeneous mixing and tend to accumulate, which remains visible after curing and leads to unattractive surfaces with nonuniform resistance. As of recently, carbon nanotubes (CNTs) are known, which are also usable as conductive fillers. These are nanotubes made of carbon, the wall of which consists of individual graphite layers, called graphenes. Carbon nanotubes, even when a very small amount is used, already enable good conductivity with uniform resistance over a large area, largely independently of humidity. On account of their high surface area, however, they have a significantly thickening effect. On application, this results in poor leveling, and makes it more difficult for deaeration to occur by escape of trapped air in the form of rising air bubbles that burst at the surface. An electrically conductive coating based on carbon nanotubes therefore needs more care and time on application and, after curing, shows a slightly uneven surface on account of incomplete deaeration. Epoxy resin-based electrostatically dissipative floors are described, for example, in EP 1,437,182, where carbon fibres are used as conductive fillers.

Amines of the formula (I) as curing agents for epoxy resins are described, for example, in EP 3,180,383 or EP 3,344,677.

SUMMARY OF THE INVENTION

It is therefore an object of the present invention to provide an electrically conductive epoxy resin coating having electrical resistance largely independent of the humidity, which shows good levelling with good deaeration in the case of working even without, or with only a low level of, non-incorporable thinners, cures rapidly, and finally has an even, esthetically pleasing surface and is suitable as a constituent of an electrostatically dissipative floor system.

Surprisingly, this object is achieved by the use of a combination of carbon nanotubes and at least one amine of the formula (I) as claimed in claim 1. Epoxy resin coatings comprising carbon nanotubes do have reliable electrical conductivity, with electrical resistance largely independent of humidity. However, the ultrafine carbon nanotubes make leveling and deaeration considerably more difficult. Particularly in the case of filled pigmented coatings, deaeration is made so much more difficult that, even after treatment of the still-liquid coating with a spiked roller or spiked footwear, the result is a slightly uneven surface with fine bubbles that have not burst. The combination with the amine of the formula (I) surprisingly enables distinctly improved leveling and significantly improved deaeration, which makes it easier to work and gives rise to an attractive, particularly even surface. The inventive use enables pigmented coatings of high color intensity, and transparent coatings in which the amine of the formula (I) surprisingly enables particularly high transparency. The cured coatings resulting from the inventive use have an esthetically pleasing, even surface, high hardness coupled with low brittleness, high robustness to mechanical and chemical stress, and electrical conductivity distributed uniformly over the surface, largely independently of humidity. The inventive use especially also enables electrically conductive coatings having particularly low emission of organic substances after curing, which are suitable for use in hospitals or cleanrooms.

The epoxy resin coating resulting from the inventive use enables an electrostatically dissipative floor system that has good and simple installability, causes particularly low emissions, and meets the highest esthetic demands. It enables floor systems having colored, particularly flat surfaces, and floor systems having a slip-resistant, transparently sealed surface scattered with sand. Further aspects of the invention are the subject of further independent claims.

Particularly preferred embodiments of the invention are the subject of the dependent claims.

WAYS OF EXECUTING THE INVENTION

The invention provides for the use of a combination of carbon nanotubes and at least one amine of the formula (I)

where
A is a divalent $C_2$ to $C_{15}$ alkylene, cycloalkylene or arylalkylene radical optionally containing one or more nitrogen atoms or ether groups, and
Z is H or —$CH_2$—Y, and
Y is H or a $C_1$ to $C_{12}$ alkyl, cycloalkyl, arylalkyl or aryl radical,
where the amine of the formula (I) contains a total of at least 8 carbon atoms,
for production of an electrically conductive epoxy resin coating.

"Carbon nanotubes" refer to carbon tubes having a diameter in the nanometer range, especially in the range from 1 to 50 nm, and a wall composed of one or more plies of graphene, i.e. carbon having carbon atoms arranged in rings.

A composition is referred to as "storage-stable" when it can be stored at room temperature in a suitable container over a prolonged period, typically over at least 3 months up to 6 months or more, without this storage resulting in any change in its application or use properties to an extent relevant to its use.

A "thinner" refers to a substance that is soluble in an epoxy resin and lowers its viscosity, and that is not chemically incorporated into the epoxy resin polymer during the curing process.

"Liquid epoxy resin" refers to an industrial polyepoxide having a glass transition temperature below 25° C.

"Molecular weight" refers to the molar mass (in grams per mole) of a molecule.

"Average molecular weight" refers to the number average $M_n$ of a polydisperse mixture of oligomeric or polymeric molecules. It is determined by gel-permeation chromatography (GPC) against polystyrene as standard.

"Pot life" refers to the period of time from the mixing of the components of an epoxy resin composition within which the composition can be processed without losses.

The "gel time" is the time interval from mixing the components of an epoxy resin composition until the gelation thereof.

A "primary amino group" refers to an amino group that is attached to a single organic radical and bears two hydrogen atoms; a "secondary amino group" refers to an amino group that is attached to two organic radicals, which may also together be part of a ring, and bears one hydrogen atom; and a "tertiary amino group" refers to an amino group that is attached to three organic radicals, two or three of which may also be part of one or more rings, and does not bear any hydrogen atoms.

"Amine hydrogen" refers to the hydrogen atoms of primary and secondary amino groups.

"Aliphatic" amine hydrogens refer to amino groups bonded to an aliphatic carbon atom.

"Amine hydrogen equivalent weight" refers to the mass of an amine or an amine-containing composition that contains one molar equivalent of amine hydrogen.

Substance names beginning with "poly", such as polyamine or polyepoxide, refer to substances that formally contain two or more of the functional groups that occur in their name per molecule.

"Room temperature" refers to a temperature of 23° C.

Percentages by weight (% by weight), abbreviated to wt %, refer to proportions by mass of a constituent of a composition or a molecule, based on the overall composition or the overall molecule, unless stated otherwise. The terms "mass" and "weight" are used synonymously in the present document.

All industry standards and norms mentioned in this document relate to the versions valid at the date of first filing.

Carbon nanotubes are produced industrially and are supplied commercially in various qualities. They have properties of interest for different areas of use. In particular, they are electrically conductive.

Suitable carbon nanotubes are especially what are called single wall carbon nanotubes.

They are preferably used in the form of a dispersion in a liquid carrier material, especially in a liquid having good compatibility with epoxy resin compositions, especially an alkyl glycidyl ether, a fatty acid ester or an ethoxylated alcohol.

Preference is given to a dispersion comprising 10% by weight of carbon nanotubes, especially in an alkyl glycidyl ether, especially a $C_{12}$ to $C_{14}$ alkyl glycidyl ether, as also used as reactive diluent for epoxy resins. Such a dispersion is commercially available, for example as Tuball® Matrix 207 (from OCSiAl).

Even a very small amount of carbon nanotubes by weight enables good electrical conductivity, but also brings about a distinct increase in viscosity and levelling properties and a certain darkening of the coating.

Preference is given to using the carbon nanotubes in such an amount that the epoxy resin coating is light enough in color to be usable as pigmented colored coating in light shades or as a transparent seal.

Preference is given to an amount in the range from 0.001% to 0.1% by weight based on the overall epoxy resin coating.

Particular preference is given to an amount in the range from 0.001% to 0.05% by weight based on the overall epoxy resin coating.

Thus, a dispersion comprising 10% by weight of carbon nanotubes is used, preferably in an amount in the range from 0.01% to 1% by weight, especially 0.01% 0.5% by weight, based on the overall epoxy resin coating.

In this range, the desired electrical conductivity and non-excessive darkening are achieved.

A pigmented coating preferably contains an amount in the range from 0.01% to 0.1% by weight, especially 0.01% to 0.05% by weight.

A transparent coating preferably contains an amount in the range from 0.001% to 0.01% by weight, especially 0.001% to 0.005% by weight.

In the amine of the formula (I), A is preferably selected from the group consisting of 1,2-ethylene, 1,2-propylene, 1,3-propylene, 1,4-butylene, 1,3-butylene, 2-methyl-1,2-propylene, 1,3-pentylene, 1,5-pentylene, 2,2-dimethyl-1,3-propylene, 1,6-hexylene, 2-methyl-1,5-pentylene, 1,7-heptylene, 1,8-octylene, 2,5-dimethyl-1,6-hexylene, 1,9-nonylene, 2,2 (4),4-trimethyl-1,6-hexylene, 1,10-decylene, 1,11-undecylene, 2-butyl-2-ethyl-1,5-pentylene, 1,12-dodecylene, 1,2-cyclohexylene, 1,3-cyclohexylene, 1,4-cyclohexylene, (1,5,5-trimethylcyclohexan-1-yl)methane-1,3,4 (2)-methyl-1,3-cyclohexylene, 1,3-cyclohexylenebis(methylene), 1,4-cyclohexylenebis(methylene), 1,3-phenylenebis(methylene), 1,4-phenylenebis(methylene), 3-oxa-1,5-pentylene, 3,6-dioxa-1,8-octylene, 4,7-dioxa-1,10-decylene, 3-aza-1,5-pentylene, 3,6-diaza-1,8-octylene, 4,7-diaza-1,11-decylene and 3-aza-1,6-hexylene.

A is preferably free of nitrogen atoms and free of ether groups.

A is preferably a $C_2$ to $C_8$ alkylene radical, especially 1,2-ethylene, 1,2-propylene, 1,3-propylene, 1,4-butylene, 1,3-butylene, 1,5-pentylene, 1,6-hexylene, 2-methyl-1,5-pentylene, 1,7-heptylene or 1,8-octylene. These amines of the formula (I) enable particularly good leveling properties.

A is more preferably 1,2-ethylene. These amines of the formula (I) enable particularly good levelling, particularly good deaeration and particularly rapid curing.

Z is preferably H.

In the amine of the formula (I), Y is preferably selected from the group consisting of H, methyl, ethyl, propyl, isopropyl, butyl, pentyl, heptyl, hept-2-yl, phenyl, naphthyl and cyclohexyl.

More preferably, Y is phenyl or cyclohexyl, especially phenyl. Such an amine of the formula (I) enables particularly rapid curing and particularly attractive surfaces having high gloss.

Most preferred is an amine of formula (I) in which A is 1,2-ethylene, Z is H and Y is phenyl.

This amine of the formula (I) is N-benzylethane-1,2-diamine. It enables epoxy resin coatings containing carbon nanotubes and having particularly good leveling and particularly even, well-deaerated surfaces and very particularly rapid curing.

An amine of the formula (I) in which Z is H may contain fractions of dialkylated amine, i.e. the corresponding amine in which Z is —$CH_2$—Y. It preferably contains not more than 30% by weight, more preferably not more than 20% by weight, especially not more than 15% by weight, of dialkylated amine. Most preferably, an amine of the formula (I) in which Z is H is used in a purity of at least 95% by weight.

The amine of formula (I) is preferably prepared by partial alkylation of at least one amine of formula $H_2N$-A-$NH_2$ with at least one alkylating agent.

The alkylation is preferably a reductive alkylation using an aldehyde as alkylating agent and hydrogen.

Preference is given to carrying out the reductive alkylation in the presence of a suitable catalyst. Preferred catalysts are palladium on charcoal (Pd/C), platinum on charcoal (Pt/C), Adams' catalyst or Raney nickel, especially palladium on charcoal or Raney nickel.

When molecular hydrogen is used, the reductive alkylation is preferably operated in a pressure apparatus at a hydrogen pressure of 5 to 150 bar, especially 10 to 100 bar. This can take place in a batchwise process or preferably in a continuous process.

The reductive alkylation is preferably carried out at a temperature within a range from 40 to 120° C., in particular 60 to 100° C.

In the case of small volatile amines such as ethane-1,2-diamine in particular, this is preferably used in a stoichiometric excess relative to the aldehyde and, after the alkylation, some or all of the unreacted amine is removed from the reaction mixture, especially by distillation or stripping. If desired, the reaction mixture may then be purified further, especially by freeing the resultant monoalkylated amine of the formula (I) in which Z is H partly or completely of the dialkylated amine in which Z is —$CH_2$—Y, by means of distillation.

The amine of the formula (I) may be in free form or in the form of the adduct with at least one epoxy resin, especially at least one aromatic diepoxide having an epoxy equivalent weight in the range from 110 to 200 g/mol, preferably 150 to 200 g/mol, especially a bisphenol A diglycidyl ether and/or bisphenol F diglycidyl ether. This adduct is in particular prepared with such an excess of amine that at least 1.3 mol of amine of the formula (I) was used per epoxy group.

Preference is given to using the amine of the formula (I) in such an amount that at least 5%, preferably at least 10%, of all amine hydrogens present in the epoxy resin coating come from amines of the formula (I). In particular, 5% to 70%, preferably 5% to 50%, of all amine hydrogens present come from amines of the formula (I). This likewise includes the amine hydrogens from adducted amine of the formula (I).

The invention further provides an electrically conductive epoxy resin coating resulting from the use described, comprising
- at least one liquid epoxy resin,
- at least one amine of the formula (I)
- carbon nanotubes, and
- at least one further constituent selected from the list consisting of further amines, accelerators, fillers, thinners, surface-active additives and stabilizers.

Suitable liquid epoxy resins are especially aromatic epoxy resins, especially the glycidyl ethers of:

bisphenol A, bisphenol F or bisphenol A/F, where A stands for acetone and F for formaldehyde used as reactants in the production of these bisphenols. In the case of bisphenol F, positional isomers may also be present, more particularly ones derived from 2,4'- or 2,2'-hydroxyphenylmethane.

dihydroxybenzene derivatives such as resorcinol, hydroquinone or catechol;

further bisphenols or polyphenols such as bis(4-hydroxy-3-methylphenyl)methane, 2,2-bis(4-hydroxy-3-methylphenyl)propane (bisphenol C), bis(3,5-dimethyl-4-hydroxyphenyl)methane, 2,2-bis(3,5-dimethyl-4-hydroxyphenyl)propane, 2,2-bis(3,5-dibromo-4-hydroxyphenyl)propane, 2,2-bis(4-hydroxy-3-tert-butylphenyl)propane, 2,2-bis(4-hydroxyphenyl) butane (bisphenol B), 3,3-bis(4-hydroxyphenyl) pentane, 3,4-bis(4-hydroxyphenyl) hexane, 4,4-bis(4-hydroxyphenyl) heptane, 2,4-bis(4-hydroxyphenyl)-2-methylbutane, 2,4-bis(3,5-dimethyl-4-hydroxyphenyl)-2-methylbutane, 1,1-bis(4-hydroxyphenyl)cyclohexane (bisphenol Z), 1,1-bis(4-hydroxyphenyl)-3,3,5-trimethylcyclohexane (bisphenol TMC), 1,1-bis(4-hydroxyphenyl)-1-phenylethane, 1,4-bis[2-(4-hydroxyphenyl)-2-propyl]benzene (bisphenol P), 1,3-bis[2-(4-hydroxyphenyl)-2-propyl]benzene (bisphenol M), 4,4'-dihydroxydiphenyl (DOD), 4,4'-dihydroxybenzophenone, bis(2-hydroxynaphth-1-yl)methane, bis(4-hydroxynaphth-1-yl)methane, 1,5-dihydroxynaphthalene, tris(4-hydroxyphenyl)methane, 1,1,2,2-tetrakis(4-hydroxyphenyl) ethane, bis(4-hydroxyphenyl) ether or bis(4-hydroxyphenyl) sulfone;

novolaks, which are especially condensation products of phenol or cresols with formaldehyde;

aromatic amines such as aniline, toluidine, 4-aminophenol, 4,4'-methylenediphenyldiamine, 4,4'-methylenediphenyldi (N-methyl)amine, 4,4'-[1,4-phenylenebis(1-methylethylidene)]bisaniline (bisaniline P) or 4,4'-[1,3-phenylenebis(1-methylethylidene)]bisaniline (bisaniline M).

Further suitable epoxy resins are aliphatic or cycloaliphatic polyepoxides, especially glycidyl ethers of saturated or unsaturated, branched or unbranched, cyclic or open-chain di-, tri- or tetrafunctional $C_2$ to $C_{30}$ alcohols, especially ethylene glycol, propylene glycol, butylene glycol, hexanediol, octanediol, polypropylene glycols, dimethylolcyclohexane, neopentyl glycol, dibromoneopentyl glycol, castor oil, trimethylolpropane, trimethylolethane, pentaerythritol, sorbitol or glycerol, or alkoxylated glycerol or alkoxylated trimethylolpropane;

a hydrogenated bisphenol A, F or A/F liquid resin, or the glycidylation products of hydrogenated bisphenol A, F or A/F;

an N-glycidyl derivative of amides or heterocyclic nitrogen bases, such as triglycidyl cyanurate or triglycidyl isocyanurate, or reaction products of epichlorohydrin with hydantoin.

Particular preference is given to aromatic diepoxides that are liquid at room temperature and have an epoxy equivalent weight in the range from 110 to 200 g/mol, preferably 150 to 200 g/mol, especially bisphenol A diglycidyl ether and/or bisphenol F diglycidyl ether, as commercially available, for example, from Olin, Huntsman or Momentive. These liquid resins enable rapid curing and high hardnesses.

Together with the liquid epoxy resin, the coating may contain proportions of solid bisphenol A resin or novolak glycidyl ethers or reactive diluents.

Suitable reactive diluents are especially butanediol diglycidyl ether, hexanediol diglycidyl ether, trimethylolpropane di- or triglycidyl ether, phenyl glycidyl ether, cresyl glycidyl ether, guaiacol glycidyl ether, 4-methoxyphenyl glycidyl ether, p-n-butylphenyl glycidyl ether, p-tert-butylphenyl glycidyl ether, 4-nonylphenyl glycidyl ether, 4-dodecylphenyl glycidyl ether, cardanol glycidyl ether, benzyl glycidyl ether, allyl glycidyl ether, butyl glycidyl ether, hexyl glycidyl ether, 2-ethylhexyl glycidyl ether, or glycidyl ethers of natural alcohols, such as in particular $C_8$ to $C_{10}$ or $C_{12}$ to $C_{14}$ or $C_{13}$ to $C_{15}$ alkyl glycidyl ethers.

The epoxy resin coating preferably contains the amines of the formula (I) already mentioned and the carbon nanotubes already mentioned in the amounts already mentioned.

The epoxy resin coating preferably contains, in addition to at least one amine of the formula (I), at least one further amine, especially at least one further amine having at least four aliphatic amine hydrogens.

Suitable amines having at least four aliphatic amine hydrogens are especially 2,2-dimethylpropane-1,3-diamine, pentane-1,3-diamine (DAMP), pentane-1,5-diamine, 1,5-diamino-2-methylpentane (MPMD), 2-butyl-2-ethylpentane-1,5-diamine (C11-neodiamine), hexane-1,6-diamine, 2,5-dimethylhexane-1,6-diamine, 2,2 (4), 4-trimethylhexane-1,6-diamine (TMD), heptane-1,7-diamine, octane-1,8-diamine, nonane-1,9-diamine, decane-1,10-diamine, undecane-1,11-diamine, dodecane-1,12-diamine, 1-amino-3-aminomethyl-3,5,5-trimethylcyclohexane (IPDA), 1,2-diaminocyclohexane, 1,3-diaminocyclohexane, 1,4-diaminocyclohexane, 1,3-bis(aminomethyl)cyclohexane, 1,4-bis(aminomethyl)cyclohexane, bis(4-aminocyclohexyl)methane, bis(4-amino-3-methylcyclohexyl)methane, bis(4-amino-3-ethylcyclohexyl)methane, bis(4-amino-3,5-dimethylcyclohexyl)methane, bis(4-amino-3-ethyl-5-methylcyclohexyl) methane, 2 (4)-methyl-1,3-diaminocyclohexane, 2,5 (2,6)-bis(aminomethyl) bicyclo[2.2.1]heptane (NBDA), 3 (4),8 (9)-bis(aminomethyl)tricyclo[5.2.1.0$^{2,6}$]decane, 1,4-diamino-2,2,6-trimethylcyclohexane (TMCDA), menthane-1,8-diamine, 3,9-bis(3-aminopropyl)-2,4,8,10-tetraoxaspiro[5.5]undecane, 1,3-bis(aminomethyl)benzene (MXDA), 1,4-bis(aminomethyl)benzene, bis(2-aminoethyl) ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine or higher oligomers of these diamines, bis(3-aminopropyl) polytetrahydrofurans or other polytetrahydrofurandiamines, polyoxyalkylenediamines or triamines, especially polyoxypropylenediamines or polyoxypropylenetriamines such as Jeffamine® D-230, Jeffamine® D-400 or Jeffamine® T-403 (all from Huntsman), diethylenetriamine (DETA), triethylenetetramine (TETA), tetraethylenepentamine (TEPA), pentaethylenehexamine (PEHA), dipropylenetriamine (DPTA), N-(2-aminoethyl)propane-1,3-diamine (N3 amine), N,N'-bis(3-aminopropyl)ethylenediamine (N4 amine), N,N'-bis(3-aminopropyl)-1,4-diaminobutane, N5-(3-aminopropyl)-2-methylpentane-1,5-diamine, N3-(3-aminopentyl) pentane-1,3-diamine, N5-(3-amino-1-ethylpropyl)-2-methylpentane-1,5-diamine, N,N'-bis(3-amino-1-ethylpropyl)-2-methylpentane-1,5-diamine, 3-(2-aminoethyl)aminopropylamine, bis(hexamethylene) triamine (BHMT), and also adducts of these amines with epoxy resins.

The further amine is preferably selected from the group consisting of TMD, IPDA, 1,2-diaminocyclohexane, 1,3-diaminocyclohexane, 1,4-diaminocyclohexane, 1,3-bis(aminomethyl)cyclohexane, 1,4-bis(aminomethyl)cyclohexane, bis(4-aminocyclohexyl)methane, 2 (4)-methyl-1,3-diaminocyclohexane, MXDA, polyoxypropylenediamines having an average molecular weight $M_n$ within a range from 200 to 500 g/mol, polyoxypropylenetriamines having an average molecular weight $M_n$ within a range from 300 to 500 g/mol, BHMT, DETA, TETA, TEPA, PEHA, DPTA, N3 amine, N4 amine, adducts of IPDA, MXDA, DETA, TETA or TEPA with epoxy resins, and mixtures of two or more of the amines mentioned.

Particular preference is given to TMD, IPDA, 1,3-bis(aminomethyl)cyclohexane, 1,4-bis(aminomethyl)cyclohexane, MXDA, polyoxypropylenediamines having an average molecular weight $M_n$ within a range from 200 to 500 g/mol, adducts of IPDA and/or MXDA with aromatic diepoxides or mixtures of two or more of the amines mentioned.

Further suitable amines are N-aminoethylpiperazine, 3-dimethylaminopropylamine (DMAPA), 3-(3-(dimethylamino) propylamino) propylamine (DMAPAPA), monoamines, polyamidoamines, especially reaction products of a mono- or polybasic carboxylic acid or ester or anhydride thereof, especially a dimer fatty acid, with a polyamine used in a stoichiometric excess, especially DETA or TETA, Mannich bases, especially phenalkamines, i.e. reaction products of phenols, especially cardanol, with aldehydes, especially formaldehyde, and polyamines, or aromatic polyamines such as, in particular, 4,4'-, 2,4'- and/or 2,2'-diaminodiphenylmethane, 2,4 (6)-tolylenediamine, 3,5-dimethylthio-2,4 (6)-tolylenediamine or 3,5-diethyl-2,4 (6)-tolylenediamine.

Preferably 5% to 50% of all amine hydrogens present in the epoxy resin coating come from amines of the formula (I), and at least one further amine having at least four aliphatic amine hydrogens is present.

This further amine having at least four aliphatic amine hydrogens is preferably selected from the group consisting of TMD, IPDA, 1,3-bis(aminomethyl)cyclohexane, MXDA and polyoxypropylenediamines having an average molecular weight $M_n$ within a range from 200 to 500 g/mol. Particular preference is given to a combination of two or more of these further amines.

Suitable accelerators are especially acids or compounds hydrolyzable to acids, especially organic carboxylic acids such as acetic acid, benzoic acid, salicylic acid, 2-nitrobenzoic acid, lactic acid, organic sulfonic acids such as methanesulfonic acid, p-toluenesulfonic acid or 4-dodecylbenzenesulfonic acid, sulfonic esters, other organic or inorganic acids, such as phosphoric acid in particular, or mixtures of the abovementioned acids and acid esters; nitrates such as calcium nitrate in particular; tertiary amines such as in particular 1,4-diazabicyclo[2.2.2]octane, benzyldimethylamine, α-methylbenzyldimethylamine, triethanolamine, dimethylaminopropylamine, imidazoles such as in particular N-methylimidazole, N-vinylimidazole or 1,2-dimethylimidazole, salts of such tertiary amines, quaternary ammonium salts, such as benzyltrimethylammonium chloride in particular, amidines, such as 1,8-diazabicyclo[5.4.0]undec-7-ene in particular, guanidines, such as 1,1,3,3-tetramethylguanidine in particular, phenols, especially bisphenols, phenolic resins or Mannich bases such as in particular 2-(dimethylaminomethyl) phenol, 2,4,6-tris(dimethylaminomethyl) phenol or polymers produced from phenol, formaldehyde and N,N-dimethylpropane-1,3-diamine, phosphites such as in particular di- or triphenyl phosphites, or compounds having mercapto groups.

Preference is given to acids, nitrates, tertiary amines or Mannich bases, especially salicylic acid, calcium nitrate or 2,4,6-tris(dimethylaminomethyl) phenol, or a combination of these accelerators.

Suitable fillers are, in particular, ground or precipitated calcium carbonate, which is optionally coated with fatty acid, especially stearates, baryte (heavy spar), talc, quartz powder, quartz sand, silicon carbide, iron mica, dolomite, wollastonite, kaolin, mica (potassium aluminum silicate), molecular sieve, aluminum oxide, zinc oxide, aluminum-doped zinc oxide, aluminum hydroxide, magnesium hydroxide, silica, cement, gypsum, fly ash, carbon black, graphite, metal powders such as aluminum, copper, iron, zinc, silver or steel, PVC powder or hollow beads.

Preferred fillers for a pigmented epoxy resin coating are calcium carbonate, talc, quartz powder, quartz sand, dolomite, wollastonite or kaolin, especially calcium carbonate, quartz powder, quartz sand or a combination thereof. Such fillers, because they do not have too high a specific weight, barely sink on application and during curing, which enables a largely homogeneous cured coating having particularly uniform electrical conductivity.

A preferred filler for a transparent epoxy resin coating is zinc oxide, especially aluminum-doped zinc oxide, especially in a small amount in the range from 0.5% to 5% by weight, preferably 1% to 3% by weight, based on the overall epoxy resin coating. Such an amount of zinc oxide can somewhat lighten and compensate for the slightly dark grayish hue of a small amount of carbon nanotubes while maintaining good electrical conductivity, which achieves high transparency largely without darkening or lightening of the background. Such a transparent epoxy resin coating is also suitable as transparent seal on all kinds of electrostatically dissipative floors. In particular, it is suitable as transparent seal on surfaces over which electrical conductive quartz sand has been scattered, with the quartz sand and the underlying coating having good visibility through the transparent seal. Such a surface is particularly slip-inhibiting and meets high esthetic demands.

A transparent epoxy resin coating preferably contains less than 0.1% by weight of fillers or pigments other than carbon nanotubes and zinc oxide; in particular, it is free of such fillers or pigments.

Suitable thinners are especially xylene, 2-methoxyethanol, dimethoxyethanol, 2-ethoxyethanol, 2-propoxyethanol, 2-isopropoxyethanol, 2-butoxyethanol, 2-phenoxyethanol, 2-benzyloxyethanol, benzyl alcohol, ethylene glycol, ethylene glycol dimethyl ether, ethylene glycol diethyl ether, ethylene glycol dibutyl ether, ethylene glycol diphenyl ether, diethylene glycol, diethylene glycol monomethyl ether, diethylene glycol monoethyl ether, diethylene glycol mono-n-butyl ether, diethylene glycol dimethyl ether, diethylene glycol diethyl ether, diethylene glycol di-n-butyl ether, propylene glycol butyl ether, propylene glycol phenyl ether, dipropylene glycol, dipropylene glycol monomethyl ether, dipropylene glycol dimethyl ether, dipropylene glycol di-n-butyl ether, 2,2,4-trimethylpentane-1,3-diol monoisobutyrate, diphenylmethane, diisopropylnaphthalene, mineral oil fractions, for example Solvesso® grades (from Exxon), alkylphenols such as tert-butylphenol, nonylphenol, dodecylphenol, cardanol (from cashew nut shell oil, containing 3-(8,11-pentadecadienyl) phenol), styrenized phenol, bisphenols, aromatic hydrocarbon resins, especially types containing phenol groups, alkoxylated phenol, especially ethoxylated or propoxylated phenol, especially 2-phenoxyethanol, adipates, sebacates, phthalates, benzoates, organic phosphoric or sulfonic esters or sulfonamides.

Preferred thinners have a boiling point of more than 200° C.

Particular preference is given to benzyl alcohol.

The epoxy resin coating preferably contains a particularly low content of thinners having a boiling point of less than 200° C., especially less than 1% by weight.

The epoxy resin coating preferably contains a low content of thinners having a boiling point of more than 200° C., especially less than 20% by weight, preferably less than 15% by weight.

Suitable surface-additives are especially defoamers, deaerating agents, wetting agents, dispersants, leveling agents or dispersed paraffin wax. The epoxy resin coating preferably contains a combination of such additives.

Suitable stabilizers are especially stabilizers against UV radiation or heat.

The epoxy resin coating optionally contains further auxiliaries and additives, especially
  pigments, especially titanium dioxide, iron oxides or chromium (III) oxide,
  compounds having mercapto groups, especially liquid mercaptan-terminated polysulfide polymers, mercaptan-terminated polyoxyalkylene ethers, mercaptan-terminated polyoxyalkylene derivatives, polyesters of thiocarboxylic acids, 2,4,6-trimercapto-1,3,5-triazine, triethylene glycol dimercaptan or ethanedithiol,
  further reactive diluents, especially epoxidized soybean oil or linseed oil, compounds containing acetoacetate groups, especially acetoacetylated polyols, butyrolactone, carbonates, aldehydes, isocyanates or silicones having reactive groups, polymers, especially polyamides, polysulfides, polyvinyl formal (PVF), polyvinyl butyral (PVB), polyurethanes (PUR), polymers having carboxyl groups, polyamides, butadiene-acrylonitrile copolymers, styrene-acrylonitrile copolymers, butadiene-styrene copolymers, homo- or copolymers of unsaturated monomers, such as, in particular, ethylene, propylene, butylene, isobutylene, isoprene, vinyl acetate or alkyl (meth)acrylates, or chlorosulfonated polyethylenes, fluorine-containing polymers or sulfonamide-modified melamines, rheology modifiers, especially antisettling agents, adhesion improvers, especially organoalkoxysilanes, flame-retardant substances, especially polybrominated diphenyl oxides or diphenyl ethers, phosphates such as in particular diphenyl cresyl phosphate, resorcinol bis (diphenyl phosphate), resorcinol diphosphate oligomer, tetraphenylresorcinol diphosphite, ethylenediamine diphosphate, bisphenol A bis(diphenyl phosphate), tris (chloroethyl)phosphate, tris(chloropropyl) phosphate, tris(dichloroisopropyl)phosphate, tris[3-bromo-2,2-bis (bromomethyl) propyl] phosphate, tetrabromobisphenol A, bis(2,3-dibromopropyl ether) of bisphenol A, brominated epoxy resins, ethylenebis(tetrabromophthalimide), ethylenebis(dibromonorbornanedicarboximide), 1,2-bis(tribromophenoxy) ethane, tris(2,3-dibromopropyl) isocyanurate, tribromophenol, hexabromocyclododecane, bis(hexachlorocyclopentadieno)cyclooctane or chloroparaffins, further conductive substances, especially doped mineral fillers, metal powders, carbon fibers, carbon black, graphite or ionic liquids, or further additives, especially film-forming auxiliaries or biocides.

The epoxy resin coating preferably comprises at least two components that are stored in separate containers and are mixed with one another only shortly before application.

The resin component contains at least the liquid epoxy resin and any further compounds containing epoxy groups.

The hardener component contains the amine of the formula (I) and any other compounds that are reactive with epoxy groups.

The further ingredients, especially the carbon nanotubes, may be present as a constituent of the resin component and/or of the hardener component. Carbon nanotubes dispersed in a liquid containing epoxy groups are preferably a constituent of the resin component.

Preference is given to an epoxy resin coating comprising a resin component containing at least one liquid epoxy resin, carbon nanotubes, at least one defoamer, optionally pigments and fillers, and optionally at least one thinner, especially benzyl alcohol, and a hardener component comprising at least one amine of the formula (I), optionally further amines, optionally at least one thinner, especially benzyl alcohol, and optionally at least one accelerator.

The epoxy resin composition is preferably not water-based and contains only a small content of water, preferably less than 5% by weight, in particular less than 1% by weight, of water. Such a coating is particularly robust with respect to moisture.

However, it is also possible that the epoxy resin coating contains a higher content of water. In particular, the resin component or hardener component or both may be water-based.

Particular preference is given to an epoxy resin coating containing 0.001% to 0.05% by weight of carbon nanotubes, less than 1% by weight of thinner having a boiling point of less than 200° C., and less than 5% by weight of water, based on the overall coating.

Such a coating has good applicability, causes barely any emissions, and enables floor coatings having particularly high resistance to moisture and good electrical conductivity.

In a preferred embodiment, the epoxy resin coating is pigmented and contains, based on the overall coating, 20% to 70% by weight, especially 30% to 60% by weight, of calcium carbonate, ground quartz, quartz sand or a combination thereof.

Such a coating enables particularly robust floor coatings in decorative colors, in which the fillers barely sink during application and curing and hence cause barely any inhomogeneities in the coating.

In a further preferred embodiment, the epoxy resin coating is transparent and contains, based on the overall composition, 0.001% to 0.01% by weight of carbon nanotubes, 1% to 3% by weight of zinc oxide, especially aluminum-doped zinc oxide, and especially less than 0.1% by weight of fillers or pigments other than carbon nanotubes and zinc oxide.

Such a coating enables high transparency, and particularly esthetic effects are achievable, especially in combination with electrically conductive decorative quartz sand.

In the epoxy resin coating, the ratio of the number of groups reactive toward epoxy groups relative to the number of epoxy groups is preferably within a range from 0.5 to 1.5, in particular 0.7 to 1.2.

The resin component and the hardener component of the epoxy resin composition are stored in separate containers. A suitable container for storage of the resin component or the hardener component is especially a bucket, a hobbock, a drum, a pouch or a cartridge. The components are storable, meaning that they can be stored prior to use for several months up to one year or longer without any change in their respective properties to a degree relevant to their use. For the use of the epoxy resin coating, the components are mixed with one another shortly before or during application. The mixing ratio between the resin component and the hardener component is preferably chosen such that the groups of the hardener component that are reactive toward epoxy groups are in a suitable ratio to the epoxy groups of the resin component, as described above. In parts by weight, the mixing ratio between the resin component and the hardener component is typically in the range from 1:10 to 10:1, preferably 1:1 to 10:1.

The components are mixed by means of a suitable method; this mixing may be done continuously or batchwise. If the mixing does not immediately precede the application, it must be ensured that not too much time passes between mixing the components and the application thereof and that application takes place within the pot life. Mixing takes place in particular at ambient temperature, which is typically within a range from about 5 to 40° C., preferably about 10 to 35° C.

Curing by chemical reaction begins with the mixing of the two components. The primary and secondary amino groups, and any further groups present that are reactive toward epoxy groups, react with the epoxy groups, resulting in ring opening (addition reaction) thereof. As a result primarily of this reaction, the epoxy resin coating polymerizes and thereby cures.

The curing preferably proceeds at ambient temperature and typically extends over a few hours to days. The duration depends on factors including the temperature, the reactivity of the constituents, the stoichiometry thereof, and the presence of accelerators.

In the freshly mixed state, the epoxy resin coating has low viscosity. The viscosity at 20° C. 5 minutes after the components have been mixed is preferably within a range from 100 to 4000 mPas, preferably 200 to 3000 mPas, in particular 300 to 2000 mPa·s, measured using a cone-plate viscometer at a shear rate of 10 s$^{-1}$.

The epoxy resin coating is applied to at least one substrate, the following substrates being particularly suitable:
concrete, mortar, cement screed, fiber cement, brick, tile, plaster, natural rocks such as granite or marble, or sand, especially electrically conductive quartz sand;
repair compounds or leveling compounds based on PCC (polymer-modified cement mortar) or ECC (epoxy resin-modified cement mortar);
metals or alloys such as aluminum, iron, steel, copper, other nonferrous metals, including surface-finished metals or alloys such as galvanized or chrome-plated metals;
asphalt or bitumen;
plastics, such as rigid and flexible PVC, polycarbonate, polystyrene, polyester, polyamide, PMMA, ABS, SAN, epoxy resins, phenolic resins, PUR, POM, TPO, PE, PP, EPM or EPDM, in each case untreated or surface-treated, for example by means of plasma, corona or flames;
fiber-reinforced plastics, such as carbon fiber-reinforced plastics (CFRP), glass fiber-reinforced plastics (GFRP), and sheet molding compounds (SMC);
coated or painted substrates, especially painted tiles, coated concrete, powder-coated metals or alloys;
coatings, paints or varnishes, especially coated floors that have been overcoated with a further floor covering layer.

If required, the substrates can be pretreated prior to application, especially by physical and/or chemical cleaning methods or the application of an activator or a primer.

The freshly mixed epoxy resin coating is applied, within its pot life, to the surface of a substrate in a layer thickness of about 0.1 to about 5 mm, typically at ambient temperature. It is applied especially by pouring onto the substrate to be coated and then spreading it evenly using, for example, a doctor blade or a rubber squeegee. It may also be applied with a brush or roller. Curing typically gives rise to homogeneous, even, glossy, nontacky, pigmented or transparent films of high hardness and robustnesss that have good adhesion to a wide variety of different substrates.

The invention further provides the cured, electrically conductive epoxy resin coating obtained from the mixed epoxy resin coating.

After curing, the epoxy resin coating has electrical conductivity within a range suitable for a constituent of an electrostatically dissipative floor system.

In particular, the epoxy resin coating after curing in a layer thickness in the range from 0.3 to 3 mm has an electrical resistance to ground, determined according to DIN EN 61340-4-1, in the range of $>5 \cdot 10^4$ ohms and $<10^9$ ohms.

If the cured epoxy resin coating is transparent, in a layer thickness of 0.5 mm on glass, it preferably has absorption at 665 nm, determined by UV-vis spectroscopy, of not more than 0.7, preferably not more than 0.6, especially not more than 0.5. Such a coating is also especially suitable as transparent seal for electrostatically dissipative floors, especially also for floors over which electrically conductive quartz sand has been scattered, with maintenance of good visibility of the color and structure of the sand and achievement of a highly esthetic surface.

The epoxy resin coating of the invention is preferably used as a constituent of an electrostatically dissipative floor system. Such a floor system is especially laid in production halls or rooms where uncontrolled electrostatic discharges are problematic. These are especially rooms where electronic components are produced, stored or used, or where highly sensitive measurement systems are operated, or where combustible liquids or explosives are handled or stored, and especially climate-controlled rooms having particularly low humidity and particularly few particles in the atmosphere, such as cleanrooms, radiological facilities or operating rooms.

The invention thus further provides an electrostatically dissipative floor system comprising, from the bottom upward,
(i) at least one substrate,
(ii) optionally at least one epoxy resin primer,
(iii) at least one grounded electrical conduction system,
(iv) at least one electrically conductive epoxy resin coating, as described above,
(v) optionally at least one distributed filler, and
(vi) optionally at least one seal.

The electrostatically dissipative floor system preferably has an overall electrical resistance to ground, determined according to DIN EN 61340-4-1, in the range of $>5 \cdot 10^4$ ohms and $<10^9$ ohms.

A suitable substrate (i) is especially concrete, optionally pretreated by means of grinding, sandblasting or shotblasting, or mortar, cement screed, fiber cement, brick, tile, gypsum, natural stones such as granite or marble, asphalt or a repair compound or leveling compound based on PCC (polymer-modified cement mortar) or ECC (epoxy resin-modified cement mortar). Preference is given to concrete, mortar or cement screed.

The substrate is preferably coated with at least one epoxy resin primer (ii). This is preferably of low viscosity and largely free of fillers. It especially serves to solidify the substrate, to close any pores and to ensure good adhesion between the substrate and the further layers. The primer is typically distributed on the substrate with a brush, a roller or a rubber squeegee. Application is effected in one or more layers, typically in an amount in the range from 0.2 to 0.5 kg/m$^2$.

Commercially available products that are suitable for the purpose are, for example, Sikafloor®-150, Sikafloor®-151, Sikafloor®-160 or Sikafloor®-161 (all from Sika).

If the substrate is uneven, after the priming, the surface can be leveled by troweling with a sand-filled epoxy resin composition.

A grounded conduction system (iii) is laid onto the optionally primed and optionally leveled substrate. For the grounding, preference is given to drilling holes in the floor and securing protruding metal screws therein. A mesh of copper wires or copper ribbons is preferably laid on the screws, these being in contact with the screws, for example via metal washers that have been placed on. The equipment for this purpose and an exact description for the installing is provided, for example, in the commercially available Sikafloor® conductive set (from Sika) According to the separation of the copper wires or ribbons and the grounding screws and the type of coating (iv), what is called a conductive film is additionally applied to this installation, which ensures electrical conduction between the copper wires or ribbons.

Suitable conductive films are especially highly conductive epoxy resin coatings, for example Sikafloor®-220 W Conductive (from Sika).

The electrical conduction system preferably comprises at least a grounded copper wire or a grounded copper ribbon and optionally at least one electrically conductive foil which is in contact therewith and has an electrical resistance of <$10^4$ ohms.

Subsequently, at least an electrically conductive epoxy resin coating (iv) containing carbon nanotubes and at least one amine of the formula (I) are applied to the electrical conduction system, and cured as described above. The epoxy resin coating (iv) may be transparent or pigmented, as described above. It is applied to the conduction system in one or more layers, especially in a layer thickness in the range from 0.1 to 5 mm, preferably 0.2 to 3 mm. It is preferably applied in just one layer in an amount in the range from 0.2 to 3 kg/m$^2$, preferably 0.3 to 2.5 kg/m$^2$.

The electrically conductive epoxy resin coating may be filled with a filler (v) which is sprinkled in during the pot life, suitable fillers being ground quartz and/or quartz sand in particular. The nature of the filler may be such that the majority sinks into the coating and solidifies the epoxy resin coating, or an excess of sand may be spread over it, such that a rough sanded surface is obtained after the curing and removal of the excess sand.

Preference is given to using at least one electrically conductive quartz sand for production of a sanded rough surface.

A suitable electrically conductive quartz sand is a quartz sand coated with an electrically conductive synthetic resin, especially having a grain size in the range from 0.1 to 1.3 mm. Such quartz sands are commercially available, for example as Granucol® Conduct 2.0 (from Dorfner).

At least one seal (vi) is optionally applied subsequently to the electrically conductive epoxy resin coating over which filler has optionally been scattered. Especially suitable for this purpose is a transparent, electrically conductive epoxy resin coating which especially contains carbon nanotubes and at least one amine of the formula (I), and preferably additionally a zinc oxide, especially an aluminum-doped zinc oxide.

The seal is especially applied in an amount in the range from 0.1 to 1 kg/m$^2$ preferably 0.2 to 0.7 kg/m$^2$.

In a preferred embodiment of the floor system, the electrically conductive epoxy resin coating (iv) is pigmented and has a layer thickness in the range from 0.1 to 5 mm, especially 0.2 to 3 mm. In this case, the floor system preferably does not have any filler remaining on the surface that has been scattered in excess or any seal. The pigmented epoxy resin coating (iv) thus preferably forms the uppermost layer of the floor system. It is particularly important here that this surface has good deaeration and is thus particularly even, in order to meet high esthetic demands.

In this embodiment, the electrical conductivity of the epoxy resin coating (iv) is sufficiently reliable and good that it is possible to dispense with what is called the conductive film, for example Sikafloor®-220 W Conductive (from Sika), in the grounded electrical conductive system (iii). This means that a whole operation including the wait time for the curing of the conductive film is dispensed with, which is particularly advantageous.

In this embodiment, the pigmented electrically conductive epoxy resin coating (iv) is preferably applied directly to at least one grounded copper wire or at least one grounded copper ribbon, and there is no electrical conductive film in between.

In a further preferred embodiment of the invention, an excess of electrically conductive quartz sand is scattered over the electrically conductive epoxy resin coating (iv) and covered with a transparent seal. The epoxy resin coating (iv) is preferably present here in a layer thickness in the range from 0.3 to 1 mm. It is preferably transparent and preferably contains a zinc oxide, especially an aluminum-doped zinc oxide. The transparent seal is preferably likewise an electrically conductive epoxy resin coating and preferably contains carbon nanotubes and at least one zinc oxide.

The floor system of the invention is preferably part of a building or of a room in a building. In particular, the floor system is present wherever uncontrolled discharges can cause damage. These are especially rooms where electronic components are produced, stored or used, or where highly sensitive measurement systems are operated, or where combustible liquids or explosives are handled or stored, and especially climate-controlled rooms having particularly low humidity and particularly few particles in the atmosphere, such as cleanrooms, radiological facilities or operating rooms.

EXAMPLES

Working examples are adduced hereinafter, which are intended to further elucidate the invention described. The invention is of course not limited to these described exemplary embodiments.

"AHEW" stands for amine hydrogen equivalent weight.
"EEW" stands for epoxy equivalent weight.
"Standard climatic conditions" ("SCC") refer to a temperature of 23±1° C. and a relative air humidity of 50±5%.

The chemicals used were unless otherwise stated from Sigma-Aldrich Chemie GmbH.

SUBSTANCES AND ABBREVIATIONS USED

CNT Dispersion 10%: Dispersion of 10% by weight of single wall carbon nanotubes in alkyl glycidyl ether, EEW 266 g/mol (Tuball® Matrix Beta 207, from OCSiAl)

Araldite® GY 250: Bisphenol A diglycidyl ether, EEW 187 g/mol (from Huntsman)

Araldite® DY-P: p-tert-butylphenyl glycidyl ether, EEW 225 g/mol (from Huntsman)

Araldite® DY-H: hexanediol diglycidyl ether, EEW 147 g/mol (from Huntsman)

Chalk Omyacarb® 10 GU (from Omya)

Al-doped ZnO Aluminum-doped zinc oxide (ZnO-23K, from Itochu)

B-EDA N-Benzylethane-1,2-diamine, AHEW 50.1 g/eq, prepared as described below

IPDA 1-Amino-3-aminomethyl-3,5,5-trimethylcyclohexane, AHEW 42.6 g/eq (Vestamin® IPD from Evonik)

MXDA 1,3-Bis(aminomethyl)benzene, AHEW 34 g/equiv. (from Mitsubishi Gas Chemical)

TMD 2,2 (4), 4-Trimethylhexamethylenediamine, AHEW 39.6 g/equiv. (Vestamin® TMD from Evonik)

D-230 Polyoxypropylenediamine, average molecular weight 230 g/mol, AHEW 60 g/mol (Jeffamine® D-230, from Huntsman)

Adduct A1 Adduct of IPDA, MXDA and Araldite® GY 250 in benzyl alcohol, AHEW 231 g/eq, prepared as described below Adduct B1 Adduct of B-EDA and Araldite® GY 250, AHEW 116.3 g/eq, prepared as described below Ancamine® K54 2,4,6-Tris(dimethylaminomethyl) phenol (from Air Products)

Sikafloor®-150:2-component epoxy resin primer (from Sika)

Sikafloor®-151:2-component epoxy resin primer (from Sika)

Sikafloor®-220 W Conductive: 2-component, water-based, highly electrically conductive, black epoxy resin coating Conductive quartz sand: Synthetic resin-coated, electrically conductive quartz sand 0.3 to 0.8 mm (Granucol® Conduct 2.0, from Dorfner)

N-Benzylethane-1,2-Diamine (B-EDA):

An initial charge of 180.3 g (3 mol) of ethane-1,2-diamine at room temperature was mixed with a solution of 106.0 g (1 mol) of benzaldehyde in 1200 ml of isopropanol and stirred for 2 hours, then hydrogenated at 80° C., hydrogen pressure 80 bar, and a flow rate of 5 ml/min in a continuous hydrogenation apparatus with a fixed bed Pd/C catalyst, and the hydrogenated solution was concentrated on a rotary evaporator at 65° C., removing unreacted ethane-1,2-diamine, water and isopropanol. The resultant reaction mixture was purified by distillation at 80° C. under reduced pressure. This gave a colorless liquid having an N-benzylethane-1,2-diamine content determined by GC of >97%.

Adduct A1:

57.3 g of IPDA, 42.5 g of MXDA and 318.8 g benzyl alcohol were heated to 80° C., and 81.3 g of Araldite® GY 250 was added gradually with good stirring, keeping the temperature of the reaction mixture between 7° and 90° C. A clear, pale yellowish liquid having a viscosity at 20° C. of 45 mPa·s was obtained.

Adduct B1:

55.0 g of N-benzylethane-1,2-diamine (B-EDA) was heated to 80° C., and 45.0 g of Araldite® GY 250 was added gradually with good stirring, keeping the temperature of the reaction mixture between 7° and 90° C. A clear, pale yellowish liquid having a viscosity at 20° C. of 262 Pa's was obtained.

The viscosity of the adducts was determined as described for example 1.

Production of Electrically Conductive Epoxy Resin Coatings:

Examples 1 to 3 (Pigmented Coating in Light Gray)

For these examples, a resin component was produced by mixing the following ingredients by means of a centrifugal mixer (SpeedMixer™ DAC 150, FlackTek Inc.) and storing it with exclusion of moisture.

125.9 parts by weight of Araldite® GY 250,
25.2 parts by weight of Araldite® DY-P,
11.5 parts by weight of Araldite® DY-H,
0.27 part by weight of CNT Dispersion 10%,
231.0 parts by weight of chalk,
12.7 parts by weight of benzyl alcohol,
5.6 parts by weight of additives/defoamers,
45.8 parts by weight of light gray pigment paste.

For each example, the ingredients of the hardener component indicated in table 1 were mixed in the amounts indicated (in parts by weight) by means of the centrifugal mixer and stored with the exclusion of moisture.

The two components were then processed using the centrifugal mixer into a homogeneous liquid and this was tested immediately as follows:

Viscosity was measured 5 min after the resin component and the hardener component had been mixed by means of a cone-plate viscometer at a shear rate of 10 s$^{-1}$ and a temperature of 20° C.

Gel time was determined by moving a freshly mixed amount of about 3 g under standard climatic conditions with a spatula at regular intervals until the mass gelated.

Shore D hardness was determined to DIN 53505 on two cylindrical test specimens (diameter 20 mm, thickness 5 mm), with storage under standard climatic conditions at 8° C. and 80% relative humidity. Hardness was measured here after 1 day, 2 days and 7 days.

A particleboard was primed with 0.3 kg/m$^2$ of Sikafloor®-150 and stored under standard climatic conditions for 24 h, then 0.1 kg/m$^2$ of Sikafloor®-220 W Conductive was applied, and the board was stored under standard climatic conditions for a further 24 h. 1.3 kg/m$^2$ of the respective epoxy resin coating was applied to the board thus coated, distributed with a squeegee and rolled over with a spiked roller in the still-liquid state for deaeration. Leveling and deaeration were observed here. Leveling was described as "very good" when the liquid coating levelled out quickly after a few strokes of the squeegee and ran nicely into the corners. Leveling was described as "ok" when the liquid coating required distinctly more strokes of the squeegee for distribution, had to be distributed into the corners and then leveled out gradually. Deaeration was described as "good" or "very good" when the finely distributed air combined to form larger bubbles on rolling with the spiked roller, these reliably burst at the surface and almost no further bubbles, or none at all, rose up after the rolling with the spiked roller. Deaeration was described as "incomplete" when, even after the rolling with the spiked roller, further finely distributed air rose up, remained at the surface of the curing coating, which was thus increasing in viscosity and finally gelating, and hence gave rise to a slightly disturbed, not entirely even surface.

Appearance was assessed on the coated particle board after a curing time of 7 days. A "nice" surface was one that was shiny and nontacky without streaks or cloudiness. An "even" surface was a smooth surface without unevenness or craters.

Electrical resistance was measured at 8 points on the coated particle board from example 1 after a curing time of 7 days under standard climatic conditions against ground according to DIN EN 61340-4-1.

The results are reported in Table 1.

The examples designated "(Ref.)" are comparative examples.

TABLE 1

Composition and properties of examples 1 to 3.

| | Example | | |
|---|---|---|---|
| | 1 | 2 | 3 (Ref.) |
| Resin component: | 458.0 | 458.0 | 458.0 |
| Hardener component: | | | |
| B-EDA | 6.0 | 12.6 | — |
| IPDA | 15.6 | 10.0 | 20.7 |
| MXDA | 9.1 | 9.1 | 9.1 |
| Adduct A1 | 57.3 | 57.3 | 57.3 |
| Benzyl alcohol | 7.7 | 7.7 | 7.7 |
| Ancamine ® K54 | 8.0 | 8.0 | 8.0 |

TABLE 1-continued

Composition and properties of examples 1 to 3.

|  | Example | | |
|---|---|---|---|
|  | 1 | 2 | 3 (Ref.) |
| Viscosity (5') [Pa · s] | 1.5 | 1.4 | 1.8 |
| Gel time [h:min] | 2:35 | 2:25 | 2:45 |
| Shore D (1d SCC) | 52 | 54 | 65 |
| (2d SCC) | 70 | 62 | 72 |
| (7d SCC) | 72 | 75 | 76 |
| Shore D (1d 8°/80%) | 31 | 31 | 26 |
| (2d 8°/80%) | 61 | 62 | 61 |
| (7d 8°/80%) | 73 | 74 | 73 |
| Leveling | very good | very good | ok |
| Deaeration | good | very good | incomplete |
| Appearance | nice, even | nice, even | nice, somewhat uneven |
| Resistance [ohms] | | | |
| Average: | $1.1 \cdot 10^6$ | n.d. | n.d. |
| Minimum: | $2.4 \cdot 10^5$ | | |
| Maximum: | $2.1 \cdot 10^6$ | | |

"n.d." stands for "not determined"

Examples 4 and 5 (Transparent Coating or Sealing)

For these examples, a resin component was produced by mixing the following ingredients by means of the centrifugal mixer and storing it with exclusion of moisture.

185.6 parts by weight of Araldite® GY 250,
0.04 part by weight of CNT Dispersion 10%,
4.2 parts by weight of Al-doped ZnO,
4.8 parts by weight of additives/defoamers,
15.4 parts by weight of benzyl alcohol.

For each example, the ingredients of the hardener component indicated in table 2 were mixed in the amounts indicated (in parts by weight) by means of the centrifugal mixer and stored with the exclusion of moisture.

The two components were then processed using the centrifugal mixer into a homogeneous liquid and this was tested as follows:

Viscosity, gel time and Shore D were tested as described for example 1.

A particleboard was primed with 0.3 kg/m² of Sikafloor®-150 and stored under standard climatic conditions for 24 h, then 0.1 kg/m² of Sikafloor®-220 W Conductive was applied, and the board was stored under standard climatic conditions for a further 24 h. 0.5 kg/m² of the respective example was applied to the board thus coated, distributed with a squeegee and rolled over with a nylon roller in the still-liquid state. Leveling and deaeration were assessed here as described for example 1.

Transparency was assessed by applying a film to a glass plate in a layer thickness of 500 µm and storing it under standard climatic conditions for 7 days. Subsequently, the glass plate was placed onto a printed newspaper and an assessment was made as to how good the visibility of the newspaper print was through the coated glass plate. Transparency was described as "high" when the print was clearly and sharply visible. Transparency was described as "average" when the print had good but diffuse visibility.

As a further measure of transparency, absorption was determined by UV-vis spectroscopy. For this purpose, absorption at 665 nm (red) was determined on the glass plate coated for assessment of transparency in a UV-vis system (Cary 60 from Agilent Technologies).

Appearance and electrical resistance were determined on the coated particle board as described for example 1.

The results are reported in Table 2.

TABLE 2

Composition and properties of examples 4 and 5.
The examples designated "(Ref.)" are comparative examples.

|  | Example | |
|---|---|---|
|  | 4 | 5 (Ref.) |
| Resin component: | 210.0 | 210.0 |
| Hardener component: | | |
| B-EDA | 4.3 | — |
| Adduct B1 | 2.9 | — |
| IPDA | 22.3 | 27.0 |
| TMD | 7.7 | 7.7 |
| D-230 | 10.3 | 10.3 |
| Benzyl alcohol | 24.0 | 24.0 |
| Viscosity (5') [Pa.s] | 0.82 | 0.84 |
| Gel time [h:min] | 2:30 | 2:40 |
| Shore D (1d SCC) | 73 | 72 |
| (2d SCC) | 79 | 78 |
| (7d SCC) | 79 | 79 |
| Shore D (1d 8°/80%) | 12 | 8 |
| (2d 8°/80%) | 64 | 64 |
| (7d 8°/80%) | 79 | 73 |
| Leveling | very good | very good |
| Deaeration | very good | very good |
| Appearance | nice, even | nice, even |
| Transparency | high | moderate |
| Absorption at 665 nm | 0.45 | 0.51 |
| Resistance [ohms] | | |
| Average: | $1.5 \cdot 10^7$ | |
| Minimum: | $3.0 \cdot 10^6$ | n.d. |
| Maximum: | $3.3 \cdot 10^8$ | |

Production of electrostatically dissipative floor systems:

Example 6

An area of 55 m² of polished indoor concrete floor was provided with an electrostatically dissipative floor system. During the installation, the air temperature was 25° C. to 30° C. and the air humidity 35% to 40%.

First of all, a layer of Sikafloor®-151 as primer was rolled on in an amount of 0.4 kg/m² and left to cure for 24 h.

Subsequently, grounding points and copper ribbons from a Sikafloor® conductive set were installed on the floor thus prepared according to the instructions.

Then 2.0 kg/m² of the electrically conductive epoxy resin coating from example 1 was applied, distributed by means of a rubber squeegee and rolled over with a spiked roller. The epoxy resin coating showed excellent leveling and very good deaeration. The resultant gray-pigmented surface was even, hard, shiny, nontacky and free of streaks or cloudiness.

The electrical resistance to ground of the finished floor system was measured at 30 points to DIN EN 61340-4-1. The range of values measured is reported in table 3.

Example 7

An area of 55 m² of polished indoor concrete floor was provided with an electrostatically dissipative floor system. During the installation, the substrate temperature was 14 to 17° C., the air temperature 13° C. to 19° C., and the air humidity 49% to 66%.

First of all, a layer of Sikafloor®-151 as primer was rolled on in an amount of 0.4 kg/m² and left to cure for 24 h.

Subsequently, grounding points and copper ribbons from a Sikafloor® conductive set were installed on the floor thus prepared according to the instructions, followed by the Sikafloor®-220 W Conductive coating, which was rolled on as a conductive film in an amount of 0.1 kg/m².

After a curing time of 24 h, 0.5 kg/m² of the transparent, electrically conductive epoxy resin coating from example 4 was applied. For this purpose, the material was poured out, distributed with a rubber squeegee and rolled over with a roller. Within 30 min after application, 3 kg/m² of conductive quartz sand was scattered over this layer in excess. After a curing time of 24 h, the excess sand was removed by means of a brush and vacuum cleaner.

The sanded surface was then transparently sealed with the electrically conductive epoxy resin coating from example 4 by distributing it in an amount of 0.4 kg/m² by means of a rubber squeegee and then rolling over it with a structured roller.

The seal had good distributability over the sanded surface and, after subsequent rolling, showed an even surface without streaks, bubbles, craters or other inhomogeneities. After curing, the floor system had a highly esthetic, even, pale gray-shimmering, hard, tack-free, transparent surface, through which the color of the sand had good visibility.

The electrical resistance to ground of the finished floor system was measured at 30 points to DIN EN 61340-4-1. The range of values measured is reported in table 3.

TABLE 3

Construction and electrical resistance of examples 6 and 7

| | Example | |
|---|---|---|
| | 6 | 7 |
| Substrate: | polished concrete | |
| Primer: | Sikafloor ®-151 | Sikafloor ®-151 |
| Conduction system: | Sikafloor ® conductive set | Sikafloor ®conductive set and Sikafloor ®-220 W Conductive |
| Epoxy resin coating: | Pigmented coating from example 1 | Transparent coating from example 4 |
| Overscattered with: | — | Conductive quartz sand |
| Seal: | — | Transparent coating from example 4 |
| Resistance to ground: [ohms] | $7.9 \cdot 10^6$ to $1.2 \cdot 10^7$ | $1.2 \cdot 10^5$ to $2.4 \cdot 10^5$ |

The invention claimed is:

1. An electrically conductive epoxy resin coating, comprising
   at least one liquid epoxy resin selected from aromatic glycidyl ethers having an epoxy equivalent weight in the range from 110 to 200 g/mol,
   at least one amine of the formula (I)

   $$Z-NH-A-NH-CH_2-Y \quad (I)$$

where
   A is a divalent $C_2$ to $C_{15}$ alkylene, cycloalkylene or arylalkylene radical optionally containing one or more nitrogen atoms or ether groups, and
   Z is H or —$CH_2$—Y, and
   Y is H or a $C_1$ to $C_{12}$ alkyl, cycloalkyl, arylalkyl or aryl radical,
   where the amine of the formula (I) contains a total of at least 8 carbon atoms,
   carbon nanotubes, and
   at least one further constituents selected from the list consisting of further amines, accelerators, fillers, thinners, surface-active additives and stabilizers.

2. The epoxy resin coating as claimed in claim 1, wherein 5% to 50% of all amine hydrogens present come from amines of the formula (I) and at least one further amine having at least four aliphatic amine hydrogens is present.

3. The epoxy resin coating as claimed in claim 1, wherein it contains less than 5% by weight of water based on the overall coating.

4. The epoxy resin coating as claimed in claim 1, wherein it contains
   0.001% to 0.05% by weight of carbon nanotubes,
   less than 1% by weight of thinner having a boiling point of less than 200° C., and
   less than 5% by weight of water,
   based on the overall coating.

5. The epoxy resin coating as claimed in claim 1, wherein it has been pigmented and, based on the overall coating, contains 20% to 70% by weight of calcium carbonate, ground quartz, quartz sand or a combination thereof.

6. The epoxy resin coating as claimed in claim 1, wherein it is transparent and contains
   0.001% to 0.01% by weight of carbon nanotubes,
   1% to 3% by weight of zinc oxide, and
   less than 0.1% by weight of fillers or pigments other than carbon nanotubes and zinc oxide,
   based on the overall coating.

7. A cured electrically conductive epoxy resin coating obtained by curing the epoxy resin coating as claimed in claim 1.

8. The epoxy resin coating as claimed in claim 1, wherein the aromatic glycidyl ether is at least one of bisphenol A diglycidyl ether and bisphenol F diglycidyl ether.

9. The epoxy resin coating as claimed in claim 1, wherein the aromatic glycidyl ether has an epoxy equivalent weight in the range from 150 to 200 g/mol.

10. The epoxy resin coating as claimed in claim 1, which additionally contains at least one of a solid bisphenol A resin, a novolak glycidyl ether, or a reactive diluent.

11. An electrostatically dissipative floor system comprising, from the bottom upward,
   (i) at least one substrate,
   (ii) optionally at least one epoxy resin primer,
   (iii) at least one grounded electrical conduction system,
   (iv) at least one cured electrically conductive epoxy resin coating as claimed in claim 7,
   (v) optionally at least one distributed filler, and
   (vi) optionally at least one seal.

12. The floor system as claimed in claim 11, wherein electrical resistance to ground, determined to DIN EN 61340-4-1, is in the range of $>5 \cdot 10^4$ ohms and $<10^9$ ohms.

13. The floor system as claimed in claim 11, wherein the cured electrical conduction system comprises at least a grounded copper wire or a grounded copper ribbon and optionally at least one electrically conductive foil which is in contact therewith and has an electrical resistance of $<10^4$ ohms.

14. The floor system as claimed in claim 11, wherein the cured electrically conductive epoxy resin coating has been pigmented and has a layer thickness in the range from 0.1 to 5 mm.

15. The floor system as claimed in claim 14, wherein the cured electrically conductive epoxy resin coating is applied directly to at least one grounded copper wire or at least one grounded copper ribbon and there is no electrically conductive foil in between.

16. The floor system as claimed in claim 11, wherein an excess of electrically conductive quartz sand is scattered over the cured electrically conductive epoxy resin coating and covered with a transparent seal.

* * * * *